UNITED STATES PATENT OFFICE.

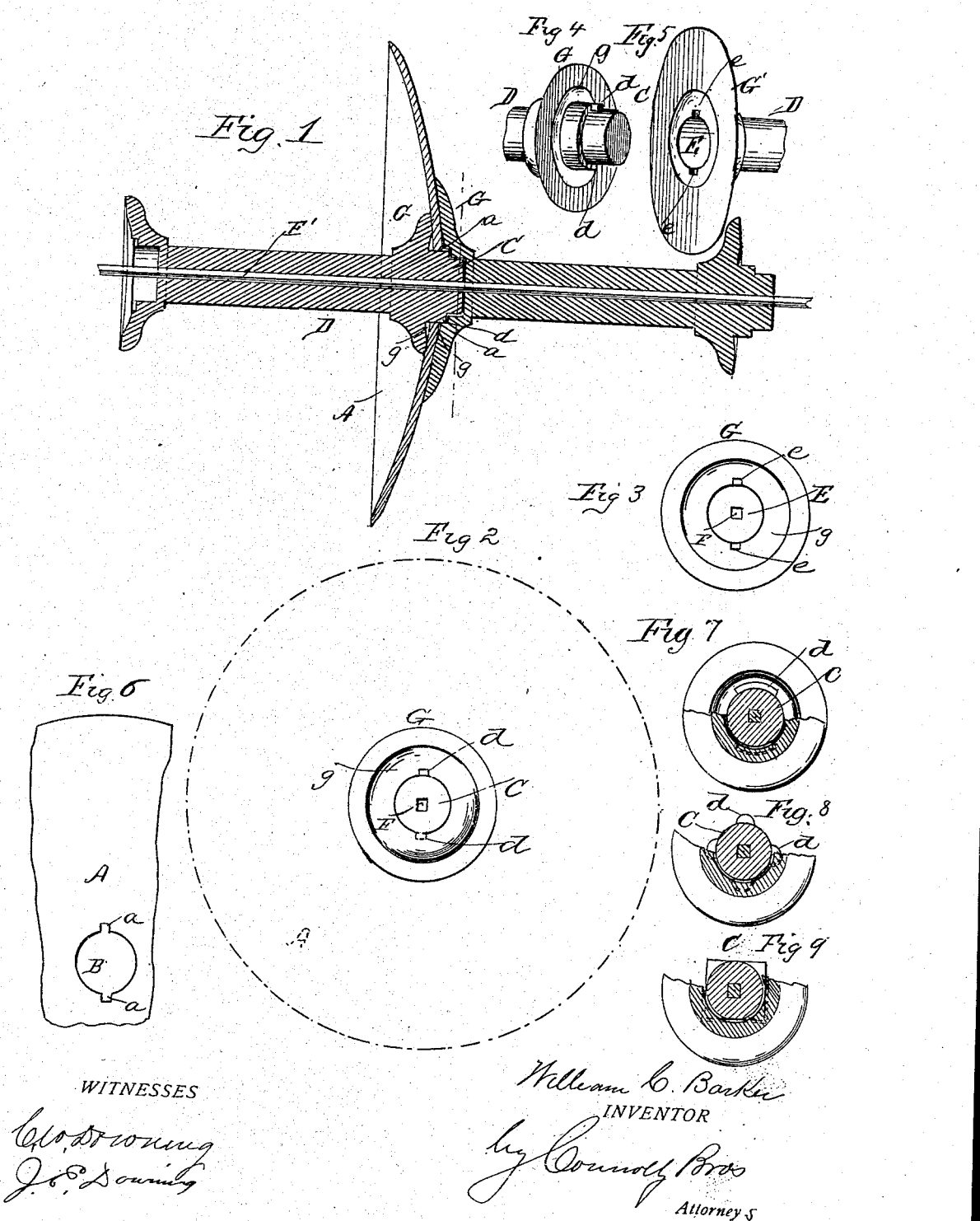

WILLIAM C. BARKER, OF NEW YORK, N. Y., ASSIGNOR TO THE BUCHER & GIBBS PLOW CO., OF CANTON, OHIO, A CORPORATION OF OHIO.

SPINDLE OR HUB FOR AGRICULTURAL IMPLEMENTS.

No. 840,288.     Specification of Letters Patent.     Patented Jan. 1, 1907.

Application filed March 17, 1906. Serial No. 306,560.

*To all whom it may concern:*

Be it known that I, WILLIAM C. BARKER, a citizen of the United States, residing at New York, in the county of New York and State of New York, have invented certain new and useful Improvements in Spindles or Hubs for Agricultural Implements, of which the following is a specification.

This invention has relation to disk harrows, disk plows, and rolling cutters, and has for its object the provision in an implement of the class referred to of, first, interlocking hub or spindle-sections so constructed and arranged as to relieve the strain on the axle-rod vertically, horizontally, or laterally; second, interlocking hub or spindle-sections so constructed and applied as to prevent the disks from revolving on the hub or axle and between the hub or spindle-faces, flanges, or collars, and thereby cutting the axle rod or hub; third, interlocking hub or spindle sections so constructed and applied as to relieve all torsional strain on the axle-rod; fourth, interlocking hub or spindle section so constructed and applied as to relieve all vertical or horizontal strain on the axle-rod.

In the accompanying drawings, Figure 1 is a central sectional view representing two hubs or spindle-sections mounted on an axle-rod and having a disk clamped between their opposing faces. Figs. 2 and 3 are face views of the opposing or male and female ends of a hub or spindle-section. Figs. 4 and 5 are perspective views of the parts shown in Figs. 2 and 3. Fig. 6 is a face view of a part of a disk. Figs. 7, 8, and 9 are sectional views of modifications of interlocking spindles.

My improvements are applicable to implements of different types, but more particularly to disk harrows, disk cultivators, disk plows, rolling cutters, and the like in which a single or a series or a gang of cutting-disks or their equivalent are arranged upon an axle or hub with interlocking hubs, spindles, or faces bound together by an axle rod or bolt, and such hubs or spindles may be square, angular, or round, and the hubs or spindles may turn with or independently of the axle-rod. The accompanying drawings, Figs. 1 to 9, inclusive, more particularly represent parts of a disk harrow in which the spindle or hub is shown as square and the hub or spindle-sections D as rigidly connected thereto—that is, formed with correspondingly-squared central holes—but the axle-rod may be round and the hubs or spindle-sections keyed thereto or, if desired or expedient, arranged loosely on the axle-rod, so as to rotate thereon.

In the construction of disk harrows or disk cultivators the hub or spindle-sections D are intended and adapted to support and separate the cutting or harrowing disks A, which are usually of concavo-convex form. According to my invention these hubs or spindle-sections consist of castings of suitable length, each of which consists of a cylindrical or other shaped shank with a flange, plate, or clamping-collar at each end, as shown at G G', respectively, the collar or flange G being convex on its outer face and the collar or flange G' correspondingly concave to conform to the concavo-convex shape of the disk. The end of the spindle having the convex collar or flange G is formed with an extension C and the collar or flange G' with a corresponding socket E, into which when the sections are assembled with the disks in position the extension C enters. As it is intended that the hub-sections shall interlock one with another, the socket E and extension C may be made square, angular, or otherwise for this purpose, or the extension E may be formed with lugs $d\ d$, as shown, which enter notches or slots $e\ e$ at the outer end of the socket E, or the socket and extension may be correspondingly grooved and ribbed on their opposing surfaces or otherwise shaped so as to interlock at their ends with each other and so as to provide for the interlocking of the disk with the extension C to prevent the disk from turning on the hub or its extension C.

The disk A is formed with a central hole B, which may be of any suitable form to coincide with the shape of that part of the extension C upon which it is mounted—as, for instance, the hole B may be formed with radial notches $a\ a$ to receive the lugs $d\ d$ on the extension C, or if the extension C is made square or angular the hole in the disk will be made to correspond in such particulars as will cause the disk and the extension to interlock. While the collars or flanges G G' are made, respectively, with convex and concave surfaces to adapt them to the shape of the disk, it is advantageous to have the flange of the concave side of the disk smaller in diameter than the flange of the convex side of the disk, so that when the disk is clamped to these flanges it will give additional curvature to the disk, and thereby hold it more rigidly in position.

As will be seen, the hub or spindle-sections when constructed and assembled as shown and described, with their ends interlocked independently of the axle-rod, form one continuous axle bound together by the axle-rod, so as to take up all torsional strain by revolving all together and exactly alike; also, that by reason of the extension C fitting snugly into the socket E and the spindles bound together by the axle-rod the latter is relieved from all vertical or horizontal strain, which under other conditions would be caused by one or more of the disks striking an obstruction.

I desire to emphasize the fact that one of the essential features of my invention is the provision of adequate means for preventing the rotation of the disks independently of the hubs or spindles. Various expedients within the spirit and scope of my invention may be used for this purpose. Thus the concave flange at the end of the spindle-section or hub may be formed or cast with studs or projections and the disk provided with holes or slots into or through which such projections pass, so as to bind or interlock the flange and disk together, and these studs and holes may be used in addition to other means already described for preventing the rotation of the disks between the flanges.

Having described my invention, what I claim as new, and desire to secure by Letters Patent, is—

A spindle or hub for agricultural implements comprising a series of shanks having, each, at one end a collar or flange with an integral central extension having laterally-extending lugs and, at the other end, a collar or flange with a central socket having notches to receive the lugs on the adjacent end of an adjoining shank.

In testimony whereof I have signed my name to this specification in the presence of two subscribing witnesses.

WILLIAM C. BARKER.

Witnesses:
A. B. MARTIN,
VICTOR ROHE.